(12) United States Patent
Van Dam et al.

(10) Patent No.: US 11,985,996 B2
(45) Date of Patent: May 21, 2024

(54) SALT PRODUCT FOR FLAVOR STABILIZATION IN CURED MEAT PRODUCTS

(71) Applicant: Givaudan SA, Vernier (CH)

(72) Inventors: Karen Van Dam, Blue Ash, OH (US); Christian Aulenbacher, Gottmadingen (DE); Stephan Haiber, Almere (NL); Susanna Magdalena Vorster, Soest (NL)

(73) Assignee: GIVAUDAN SA, Vernier (CH)

( * ) Notice: Subject to any disclaimer, the term of this patent is extended or adjusted under 35 U.S.C. 154(b) by 554 days.

(21) Appl. No.: 16/305,992

(22) PCT Filed: Jun. 15, 2017

(86) PCT No.: PCT/EP2017/064724
§ 371 (c)(1),
(2) Date: Nov. 30, 2018

(87) PCT Pub. No.: WO2017/216319
PCT Pub. Date: Dec. 21, 2017

(65) Prior Publication Data
US 2019/0216120 A1 Jul. 18, 2019

Related U.S. Application Data

(60) Provisional application No. 62/351,573, filed on Jun. 17, 2016.

(51) Int. Cl.
| | |
|---|---|
| *A23L 27/40* | (2016.01) |
| *A23B 4/023* | (2006.01) |
| *A23L 13/70* | (2023.01) |
| *A23L 13/72* | (2023.01) |

(52) U.S. Cl.
CPC ............. *A23L 27/40* (2016.08); *A23B 4/023* (2013.01); *A23L 13/70* (2016.08); *A23L 13/72* (2016.08); *A23V 2002/00* (2013.01)

(58) Field of Classification Search
None
See application file for complete search history.

(56) References Cited

U.S. PATENT DOCUMENTS

| | | | | |
|---|---|---|---|---|
| 2,173,992 A | * | 9/1939 | Allen ..................... | A23B 4/015 426/248 |
| 2,937,094 A | | 5/1960 | Rupp et al. | |
| 4,434,187 A | * | 2/1984 | Chandler ................. | A23B 4/02 426/652 |
| 6,713,106 B1 | * | 3/2004 | Underwood ........... | A23B 4/023 426/264 |
| 8,501,253 B2 | * | 8/2013 | Maki ....................... | A23L 27/40 426/74 |
| 2008/0038430 A1 | | 2/2008 | Visser et al. | |
| 2010/0040746 A1 | | 2/2010 | Shull | |
| 2012/0045550 A1 | | 2/2012 | Stokkers et al. | |
| 2013/0309381 A1 | | 11/2013 | Haseleu et al. | |

FOREIGN PATENT DOCUMENTS

| | | |
|---|---|---|
| CA | 1 160 099 A | 1/1984 |
| CN | 103054051 A | 4/2013 |
| CN | 103549484 A | 2/2014 |
| EP | 0636321 A1 | 2/1995 |
| ES | 2390430 A1 | 11/2012 |
| WO | WO 9937170 A1 | 7/1999 |
| WO | WO 2005/094615 A1 | 10/2005 |

OTHER PUBLICATIONS

ARBOIX: WO2012140293; published Oct. 18, 2012. (Year: 2012).*
Allied Kemco: Additive—Sodium Phosphate—16 Oz.; published at least by Jan. 17, 2012 at: https://web.archive.org/web/20120117221133/https://www.alliedkenco.com/additive-sodiumphosphate-16oz.aspx (Year: 2012).*
Matis: The role and fate of added phosphates in salted cod products; published Jul. 2010. (Year: 2010).*
NCHFP: Curing and Smoking Meats for Home Food Preservation Literature Review and Critical Preservation Points; published online by at least Nov. 15, 2011 at: https://web.archive.org/web/20111115195348/https://nchfp.uga.edu/publications/nchfp/lit_rev/cure_smoke_cure.html (Year: 2011).*
PCT/EP2017/064724—International Search Report, Aug. 29, 2017.
PCT/EP2017/064724—International Written Opinion, Aug. 29, 2017.

* cited by examiner

*Primary Examiner* — Patricia A George
(74) *Attorney, Agent, or Firm* — Curatolo Sidoti & Trillis Co., LPA; Floyd Trillis, III; Salvatore A. Sidoti

(57) ABSTRACT

A low sodium salt product for curing meats is provided. The low sodium salt product for curing meats includes sodium chloride; a sodium chloride replacing material selected from the group consisting of potassium chloride, magnesium chloride, calcium chloride, ammonium chloride, magnesium sulphate and combinations thereof; at least one flavorant; at least one nitrite; and a phosphate flavor stabilizing agent present in an amount to inhibit the reaction of the at least one flavorant and the at least one nitrite.

13 Claims, No Drawings

SALT PRODUCT FOR FLAVOR STABILIZATION IN CURED MEAT PRODUCTS

CROSS REFERENCE TO RELATED APPLICATIONS

This application is a national stage application of International Application No. PCT/EP2017/064724, filed 15 Jun. 2017, which claims priority from U.S. Provisional Patent Application No. 62/351,573, filed 17 Jun. 2016, which applications are incorporated herein by reference.

FIELD OF THE INVENTION

The present disclosure relates to stabilization of flavors. More particularly, the present disclosure relates to a low sodium salt product for the stabilization of flavors in cured meat products.

BACKGROUND OF THE INVENTION

The preservation of meat and meat products has been practiced for many years in a variety of ways, such as treating a meat product with additives such as salt, color-fixing ingredients and seasonings in order to impart desired palatability traits to the meat product.

Meat curing agents or additives include sodium chloride, sodium and potassium nitrate, sodium and potassium nitrite, sugar, seasonings, and the like. The salt content of such cured meats generally varies from about 1 to about 12% by weight depending on the particular type of meat product. Salt is used for flavor, preservation and extraction of myofibrillar protein. Nitrite promotes color development, flavor and preservation by inhibiting the growth of microorganisms and fat oxidation.

A problem that has occurred with most cured meat products that are currently available is that the relatively high levels of salt employed in these products renders many of them unsuitable for consumers restricted to low salt or low sodium diets. As such, there is a need to reduce human sodium intake. One way to lower sodium intake is by using a granulated salt product that replaces a portion of sodium chloride with a sodium chloride-replacing material, for example, potassium chloride and flavor. Such low sodium salt products have been described, for example, in U.S. 2012/0045550 to Akzo Nobel Chemicals and have been commercialized by Akzo Nobel Chemicals under the trademark Suprasel® OneGrain®. This product brings sodium salt, potassium salt and flavor homogenously together in a single grain.

Additional additives, such as nitrites, can also be included in a single grain low sodium salt product. However, the inclusion of nitrites results in stability issues that causes changes in a flavor, for example, the intended flavor can be destroyed or distorted, as well as new flavors developed due to ingredients interacting.

Accordingly, there remains a need to provide flavors in a stable form for use in preparing cured meat products, so that the flavor is stable to oxidation and hydrolysis during the shelf life of the meat product.

SUMMARY OF THE INVENTION

In one embodiment, a low sodium salt product for curing meats includes sodium chloride; a sodium chloride replacing material selected from the group consisting of potassium chloride, magnesium chloride, calcium chloride, ammonium chloride, magnesium sulphate and combinations thereof; at least one flavorant; at least one nitrite; and a phosphate flavor stabilizing agent present in an amount to inhibit the reaction of the at least one flavorant and the at least one nitrite.

In another embodiment, a low sodium salt product for curing meats includes sodium chloride; a sodium chloride replacing material; at least one flavorant; at least one nitrite; and a phosphate flavor stabilizing agent. The low sodium salt product delivers about 0.01% of the at least one nitrite to the cured meat.

These and other features, aspects and advantages of specific embodiments will become evident to those skilled in the art from a reading of the present disclosure.

DETAILED DESCRIPTION OF THE INVENTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

Salt Product

One of the most important criterion for consumer acceptance of foods is flavor. In response, Applicants have developed a low sodium salt product that makes it possible to deliver a stable flavor to consumers in cured meats.

According to the present disclosure, a low sodium salt product for curing meats is provided. The salt product according to the present disclosure includes sodium chloride; a sodium chloride replacing material; at least one flavorant; at least one nitrite; and a phosphate stabilizing agent for preventing the destruction of the flavorant caused by the reaction of the flavorant and the nitrite. The salt product may also include other optional ingredients for particular applications.

The salt product according to the present disclosure, effectively inhibits nitrite from reacting with the flavorant(s) in cured meat products, resulting in a flavor that is stable to oxidation and hydrolysis during the shelf life of the meat product.

According to the present disclosure, the term "curing" refers to any of various food preservation and flavoring processes of foods such as meat and fish by the addition of combinations of salt, nitrates, nitrites and/or sugar with the aim of drawing moisture out of the food by the process of osmosis.

Broadly, meat products that can be cured in this manner include intact meat products and comminuted meat products. Intact meat products include bacon, corned beef, ham, smoked butt, pork hocks, chicken, turkey and related meat products. Comminuted meat products include all types of sausage items. Products intermediate to these categories include sectioned meat products, chunked meat products and formed meat products.

Exemplary cured meat products include, but are not limited to, bresaola, cacciatore, capicola, coppa, cotechino, culatello, guanciale, lardo, mortadella, pancetta, pepperoni, porchetta, prosciutto, salame, sopressata, speck, jambon de bayonne, saucisson sec, and lomo.

In one embodiment, a low sodium salt product in accordance with the present disclosure may include sodium chloride and sodium chloride replacing material. The sodium chloride may be of several different origins, for example, sea salt, rock salt, purified (vacuum) salt, or a synthetic salt. The salt product may include from about 40% to about 60%, in another embodiment from about 45% to about 55%, in yet another embodiment about 50%, or any individual number within the range, by weight of the salt product of sodium chloride.

In one embodiment, the sodium chloride replacing material is selected from the group consisting of potassium chloride, magnesium chloride, calcium chloride, ammonium chloride, magnesium sulphate and combinations thereof. Use of the sodium chloride replacing material reduces the amount of sodium in the final product, thus lowering an individual's sodium intact. The salt product may include from about 20% to about 40%, in another embodiment from about 25% to about 35%, in yet another embodiment about 30%, or any individual number within the range, by weight of the salt product of sodium chloride replacing material.

According to one embodiment, disclosed is a low sodium salt product for curing meats comprising: about 50 wt. % sodium chloride, about 31.4 wt. % sodium chloride replacing material, about 4.6 wt. % flavorant, about 0.46 wt. % nitrite and about 13.9 wt. % phosphate flavor stabilizing agent.

In one embodiment, a low sodium salt product in accordance with the present disclosure may include a flavorant. By "flavorant" it is meant a composition created by a flavorist using methods known to the skilled person that is a mixture of tastants, aroma compounds and sensates. Flavorants are known to the person skilled in the art and can for example be found in S. Arctander, *Perfume and Flavor Chemicals (Aroma Chemicals)*, Vols. 1 and 2, 1969. The term flavorant includes spice oleoresins and oils derived from any of allspice, basil, capsicum, cinnamon, cloves, cumin, dill, garlic, marjoram, nutmeg, paprika, black pepper, rosemary, and turmeric; essential oils including anise oil, caraway oil, clove oil, eucalyptus oil, fennel oil, garlic oil, ginger oil, peppermint oil, onion oil, pepper oil, rosemary oil, and spearmint oil; citrus oils such as orange oil, lemon oil, bitter orange oil and tangerine oil; alliaceous flavors including garlic, leek, chive, and onion; botanical extracts including arnica flower extract, chamomile flower extract, hops extract, and marigold extract; botanical flavor extracts including blackberry, chicory root, cocoa, coffee, kola, licorice root, rose hips, sassaparilla root, sassafras bark, tamarind, licorice, and vanilla extracts; protein hydrolysates including hydrolyzed vegetable protein (HVPs), meat protein hydrolysates, milk protein hydrolysates; compounded flavors both natural and artificial including those disclosed in S. Heath, Source Book of Flavors, Avi Publishing Co. Westport, Conn., pp. 149-277, 1981, which is incorporated herein by reference in its entirety; and processed (reaction) flavors prepared through a Maillard-type reaction between reducing sugars and protein-derived components including amino acids.

Suitable flavorants for use in accordance with the present disclosure, include, but are not limited to, TasteSolutions® salt enhancer flavorants available from Givaudan Flavors Corp. These flavorants use a range of ingredients to recreate the desirable salt profile, while reducing the amount of salt without compromising the taste or quality of foods.

The low sodium salt product may include from about 2% to about 7%, in another embodiment from about 3% to about 6%, in yet another embodiment from about 4% to about 5%, or any individual number within the range, by weight of the salt product of at least one flavorant.

In another embodiment, active elements in addition to or in place of flavorants may be included. Examples of suitable active elements include, but are not limited to, flavor precursors, aromas, aroma precursors, taste enhancers, salts, sugars, amino-acids, polysaccharides, enzymes, peptides, proteins or carbohydrates, food supplements, food additives, hormones, bacteria, plant extracts, medicaments, drugs, nutrients, chemicals for agro-chemical or cosmetical applications, carotenoids, vitamins, nutritional supplements, antioxidants or nutraceuticals selected from the group comprising of lutein, lutein esters, β-carotene, tocopherol, tocopherol acetate, tocotrienol, lycopene, Co-$Q_{10}$, flax seed oil, fish oil, omega-3 oils, omega-6 oils, DHA, EPA, arachidonic-rich oils, LCPUFA oils, menthol, mint oil, lipoic acid, vitamins, polyphenols and their glycosides, ester and/or sulfate conjugates, isoflavones, flavonols, flavanones and their glycosides such as hesperidin, flavan 3-ols comprising catechin monomers and their gallate esters such as epigallocatechin gallate and their procyanidin oligomers, vitamin C, vitamin C palmitate, vitamin A, vitamin B, vitamin $B_{12}$, vitamin D, α- and/or γ-polyunsaturated fatty acids, phytosterols, esterified phytosterols, free, non esterified phytosterols, zeaxanthine, caffeine, and a combination thereof.

In one embodiment, a low sodium salt product in accordance with the present disclosure may include at least one nitrite and a phosphate flavor stabilizing agent. The source of the nitrite may be organic or inorganic as is well known to one skilled in the art. In one example, inorganic nitrites such as sodium nitrite, potassium nitrite, calcium nitrite, magnesium nitrite, and ammonium nitrite may be used.

In another embodiment, the source of the phosphate flavor stabilizing agent may be alkali metal phosphates or alkaline earth metal phosphates. In one example, phosphates may include phosphate, hydrogen phosphate and dihydrogen phosphate. In one embodiment, the phosphate flavor stabilizing agent may be soluble in water and is included in an amount that is sufficient to inhibit the reaction of the at least one nitrite and the at least one flavorant.

In one embodiment, a low sodium salt product in accordance with the present disclosure may include about 50% sodium chloride, about 31.4% sodium chloride replacing material, about 0.46% flavorant, about 0.46% nitrite and about 13.9% phosphate flavor stabilizing agent.

For example, the weight ratio of phosphate flavor stabilizing agent to nitrite is from about 15:1 to about 60:1, in another embodiment from about 20:1 to about 40:1; in yet another embodiment from about 25:1 to about 35:1; and in yet another embodiment 30:1. As a result, the low sodium salt product may deliver from about 0.005% to about 0.05% nitrite; and in another embodiment about 0.01% nitrite, to the cured meat.

Optional Ingredients

The low sodium salt product may, optionally, include additional ingredients which include, but are not limited to, materials that suppress, enhance, influence or change the taste and/or flavor, or materials that influence the caking properties, free flowability, colour, texture, microbial stability, odor or nutritional value of the salt product or the food product in which the salt product of the present disclosure may be used. In one embodiment, the additive may be a masking agent (e.g. to mask the unpleasant (bitter or metallic) taste of sodium chloride-replacing materials). In one embodiment, suitable masking agents can be selected from the agents described in U.S. Pat. No. 7,981,457 and U.S. 2013/0309381, both of which are incorporated herein in their entirety.

A process to prepare the low salt sodium products to cure meats according to the present disclosure is, for example, the process described in U.S. 2012/0045550 to Akzo Nobel Chemicals.

EXAMPLES

The following examples are given solely for the purpose of illustration and are not to be construed as limitations of the present invention, as many variations of the invention are possible without departing from the spirit and scope of the present disclosure.

Examples 1, 2 and 3

Three low sodium salt products (Ex. 1, Ex. 2 and Ex. 3) were prepared and are shown in Table 1. Example 1 contained no phosphate and no nitrite; Example 2 contained only nitrite; and Example 3 contained phosphate and nitrite.

TABLE 1

| Ingredients | Ex. 1 (wt %) | Ex. 2 (wt %) | Ex. 3 (wt %) |
|---|---|---|---|
| NaCl | 1.02 | 1.02 | 1.02 |
| KCl | 0.68 | 0.68 | 0.68 |
| Flavorant[1] | 0.10 | 0.10 | 0.10 |
| $K_3PO_4$ | | | 0.30 |
| Nitrite | | 0.01 | 0.01 |

[1]TasteSolutions ® salt enhancer flavorant available from Givaudan Flavors Corp.

For each formulation, two samples were prepared—one at room temperature and one at 40° C. The water content of the samples was 1%. After 30 days, the low sodium salt products according to the formulations of Table 1 were assessed by a sensory panel comprising 3 technical experts.

| Sample | Stability Test Results |
|---|---|
| Example 1 | RT (little more mushroom/no off-note) |
| | 40° C. (little more mushroom/no off-note) |
| Example 2 | RT (little more mushroom/no off-note) |
| | 40° C. (little more mushroom/different, off-note starting to develop) |
| Example 3 | RT (completely neutral/no off-note) |
| | 40° C. (completely neutral/no off-note) |

The samples containing the phosphate are found to overcome the problem of off-note formation and to be less mushroomy compared to samples without the phosphate.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A low sodium salt product for curing meats comprising:
   greater than 50 to up to 60% by weight of the salt product of sodium chloride;
   a sodium chloride replacing material selected from the group consisting of potassium chloride, magnesium chloride, calcium chloride, ammonium chloride, magnesium sulphate and combinations thereof;
   at least one flavorant;
   at least one nitrite; and
   a phosphate flavor stabilizing agent selected from alkali metal phosphates or alkaline earth metal phosphates present in an amount to inhibit the reaction of the at least one flavorant and the at least one nitrite,
   wherein the weight ratio of phosphate flavor stabilizing agent to nitrite is from about 25:1 to about 35:1.

2. The low sodium salt product according to claim 1, wherein the weight ratio of phosphate flavor stabilizing agent to nitrite is about 30:1.

3. The low sodium salt product according to claim 1, wherein the product delivers from about 0.005% to about 0.05% nitrite to the cured meat.

4. The low sodium salt product according to claim 1, wherein the product delivers about 0.01% nitrite to the cured meat.

5. The low sodium salt product according to claim 1, including from about 3% to about 6% by weight of the salt product of the at least one flavorant.

6. The low sodium salt product according to claim 1, wherein the at least one nitrite is selected from the group consisting of sodium nitrite, potassium nitrite, calcium nitrite, magnesium nitrite, ammonium nitrite and mixtures thereof.

7. A low sodium salt product for curing meats comprising:
   greater than 50 to up to 60% by weight of the salt product of sodium chloride;
   about 31.4 wt. % of a sodium chloride replacing material;
   about 4.6 wt. % of at least one flavorant;
   about 0.46 wt. % of at least one nitrite; and
   about 13.9 wt. % of a phosphate flavor stabilizing agent selected from alkali metal phosphates or alkaline earth metal phosphates,
   wherein the low sodium salt product delivers about 0.01% of the at least one nitrite to the cured meat.

8. The low sodium salt product according to claim 7, wherein the weight ratio of phosphate flavor stabilizing agent to nitrite is about 30:1.

9. The low sodium salt product according to claim 1, wherein the salt product is granulated.

10. The low sodium salt product according to claim 1, wherein the salt product comprises from 20 to 40% by weight of the sodium chloride replacing material.

11. The low sodium salt product according to claim 7, wherein the salt product is granulated.

12. The low sodium salt product according to claim 7, wherein the weight ratio of phosphate flavor stabilizing agent to nitrite is about 25:1 to about 35:1.

13. A method of using the low sodium salt product of claim 1 to cure meat.

\* \* \* \* \*